United States Patent
Gu et al.

(10) Patent No.: US 11,329,600 B2
(45) Date of Patent: May 10, 2022

(54) METHOD AND APPARATUS FOR RECTIFYING DEGRADATION OF PHOTOVOLTAIC MODULE IN PHOTOVOLTAIC POWER STATION

(71) Applicant: HUAWEI DIGITAL POWER TECHNOLOGIES CO., LTD., Shenzhen (CN)

(72) Inventors: Xin Gu, Shanghai (CN); Peijun Shen, Shanghai (CN); Xianmiao Zhang, Shanghai (CN)

(73) Assignee: HUAWEI DIGITAL POWER TECHNOLOGIES CO., LTD., Shenzhen (CN)

( * ) Notice: Subject to any disclaimer, the term of this patent is extended or adjusted under 35 U.S.C. 154(b) by 94 days.

(21) Appl. No.: 16/906,280

(22) Filed: Jun. 19, 2020

(65) Prior Publication Data
US 2020/0321911 A1    Oct. 8, 2020

Related U.S. Application Data

(63) Continuation of application No. PCT/CN2018/121946, filed on Dec. 19, 2018.

(30) Foreign Application Priority Data

Dec. 20, 2017 (CN) .......................... 201711387820.0

(51) Int. Cl.
*H02S 40/32* (2014.01)
*H02J 3/38* (2006.01)

(52) U.S. Cl.
CPC .............. *H02S 40/32* (2014.12); *H02J 3/381* (2013.01); *H02J 2300/26* (2020.01)

(58) Field of Classification Search
CPC .......... H02J 3/381; H02J 3/38; H02J 2300/26; H02S 40/32
See application file for complete search history.

(56) References Cited

FOREIGN PATENT DOCUMENTS

| | | | |
|---|---|---|---|
| CN | 102544212 | A | 7/2012 |
| CN | 102569510 | A | 7/2012 |
| CN | 103137730 | A | 6/2013 |
| CN | 102864439 | B | 4/2014 |
| CN | 104505424 | A | 4/2015 |
| CN | 105915172 | A | 8/2016 |
| CN | 106601868 | A | 4/2017 |
| CN | 106684924 | A | 5/2017 |
| CN | 107276517 | A | 10/2017 |
| CN | 108306612 | A | 7/2018 |
| DE | 102006012920 | B3 | 1/2008 |
| DE | 102014106292 | A1 | 11/2015 |
| KR | 20150059957 | A | 6/2015 |
| WO | 2007107351 | A1 | 9/2007 |
| WO | 2012168249 | A2 | 12/2012 |
| WO | 2014191846 | A1 | 12/2014 |

*Primary Examiner* — Robert L Deberadinis (57) ABSTRACT

A method for rectifying degradation of a photovoltaic module in a photovoltaic power station, includes: controlling a to-be-rectified photovoltaic module in a photovoltaic power station to stop outputting; and then injecting a rectification current into a positive or negative electrode of the to-be-rectified photovoltaic module.

20 Claims, 3 Drawing Sheets

| | 101 |
|---|---|
| Control a to-be-rectified photovoltaic module in a photovoltaic power station to stop outputting | |
| Inject a rectification current into a positive or negative electrode of the to-be-rectified photovoltaic module | 102 |

METHOD AND APPARATUS FOR RECTIFYING DEGRADATION OF PHOTOVOLTAIC MODULE IN PHOTOVOLTAIC POWER STATION

CROSS-REFERENCE TO RELATED APPLICATIONS

This application is a continuation of International Application No. PCT/CN2018/121946, filed on Dec. 19, 2018, which claims priority to Chinese Patent Application No. 201711387820.0, filed on Dec. 20, 2017. The disclosures of the aforementioned applications are hereby incorporated by reference in their entireties.

TECHNICAL FIELD

This disclosure relates to the field of photovoltaic power generation, and in particular, to a method and an apparatus for rectifying degradation of a photovoltaic module in a photovoltaic power station.

BACKGROUND

As a new green energy utilization form, photovoltaic power generation has been highly valued and vigorously developed in China in recent years. A principle of photovoltaic power generation is to convert light energy into electric energy by using a photovoltaic module (that is, a solar panel).

A photovoltaic module mainly includes a backplane, encapsulation glass opposite to the backplane, a frame disposed surrounding the backplane and the encapsulation glass, a sealing material used for sealing between the frame and the backplane and between the frame and the encapsulation glass, a cell string disposed between the backplane and the encapsulation glass, and a connection box disposed on the backplane. Terminals of the connection box are respectively connected to a positive electrode and a negative electrode of the cell string.

Once made, the photovoltaic module is always in a degradation state, and in particular after the photovoltaic module starts to be exposed to the sun degradation of the photovoltaic module accelerates dramatically, greatly reducing power generation efficiency of the photovoltaic module. Degradation of the photovoltaic module is a decrease in an output power of the photovoltaic module. Factors that cause degradation of the photovoltaic module include initial light-induced degradation of the module, material aging degradation of the module, potential induced degradation, degradation caused by an external environment or a destructive factor, and the like.

To eliminate a power generation capacity loss caused by degradation of a photovoltaic module, a module rectification method is provided in a related technology. The method is mainly used to rectify potential induced degradation. The specific rectification method is: applying a voltage to a frame of the photovoltaic module and a positive electrode (or a negative electrode) of a cell string, to form a negative bias between the frame and the negative electrode of the cell string, and provide energy to alkaline metal ions that have migrated into the cell string, so that the alkaline metal ions return to outside of the cell string, thereby rectifying potential induced degradation. The method can rectify potential induced degradation to some extent, but cannot rectify degradation of the photovoltaic module such as initial light-induced degradation of the module and material aging degradation of the module. Consequently, a great power generation capacity loss is still caused by degradation of the photovoltaic module.

SUMMARY

Embodiments of this disclosure provide a method and an apparatus for rectifying degradation of a photovoltaic module in a photovoltaic power station, to resolve a problem that a photovoltaic module rectification method provided in the prior art can rectify only potential induced degradation.

According to a first aspect, a method for rectifying degradation of a photovoltaic module in a photovoltaic power station is provided. The method includes: controlling a to-be-rectified photovoltaic module in a photovoltaic power station to stop outputting, where the to-be-rectified photovoltaic module includes one photovoltaic module or at least two serially-connected photovoltaic modules; and injecting a rectification current into a positive or negative electrode of the to-be-rectified photovoltaic module.

In this solution, the current is injected into the positive or negative electrode of the to-be-rectified photovoltaic module, to input the rectification current into a cell string through a positive or negative electrode of the cell string in the photovoltaic module, rectifying initial light-induced degradation of the photovoltaic module, material aging degradation of the module, and potential induced degradation. The following describes a principle of rectifying degradation by injecting the current: (1) After the rectification current is injected, an active center that causes light-induced degradation inside the photovoltaic module reacts with an injected nonequilibrium electron and hole, to change to a state in which degradation does not occur, rectifying degradation that occurs originally under light. In this way, initial light-induced degradation of the module is rectified. (2) After the rectification current is injected, a temperature inside the photovoltaic module increases dramatically, and moisture inside the photovoltaic module can be discharged. This prevents the moisture from corroding the electrodes and interconnection parts of the cell string and also avoids a power decrease caused by a leakage current generated due to the moisture on the electrodes and the interconnection parts of the cell string. In addition, with the injected rectification current, a spatial structure of a passivation layer can be recovered to an original state under combined action of the temperature and the current, and a passivation effect of the passivation layer is recovered, rectifying material aging degradation of the module. (3) After the rectification current is injected, a relatively high potential difference is generated between the positive electrode and the negative electrode of the photovoltaic module, to separate, from the cell string, alkaline metal ions that have entered the cell string originally, rectifying potential induced degradation to some extent. (4) After the rectification current is injected, some defects (for example, a boron-oxygen complex or an iron-boron pair) that exist in a cell encapsulated in the photovoltaic module are dissolved by the current, to eliminate the defects that have a recombination activity originally, so as to recover part of performance that has been degraded. In this way, degradation of the photovoltaic module caused by another reason is rectified. To sum up, in this embodiment of this disclosure, using this method to rectify the photovoltaic module can rectify initial light-induced degradation of the module, material aging degradation of the module, potential induced degradation, and degradation of the photovoltaic module caused by another reason (for example, an external environment or a destructive factor).

That a to-be-rectified photovoltaic module stops outputting means that a current generated in the to-be-rectified photovoltaic module cannot be output to a power grid or another electric device through an inverter circuit.

For example, the controlling a to-be-rectified photovoltaic module in the photovoltaic power station to stop outputting may be controlling a circuit of the to-be-rectified photovoltaic module in the photovoltaic power station to be broken. The controlling a circuit of the to-be-rectified photovoltaic module in the photovoltaic power station to be broken means disconnecting a photovoltaic module string that includes the to-be-rectified photovoltaic module from an inverter circuit in the photovoltaic power station. For another example, another current is controlled to be directly injected into the to-be-rectified photovoltaic module, so that the to-be-rectified photovoltaic module stops outputting.

The injecting a rectification current into a positive or negative electrode of the to-be-rectified photovoltaic module is inputting the current into the to-be-rectified photovoltaic module through the positive electrode or the negative electrode of the photovoltaic module.

With reference to the first aspect, in a first implementation of the first aspect, the rectification current is provided by using a direct current, an alternating current, or a current that alternates between a direct current and an alternating current.

In this implementation, it is specified that the rectification current may be a direct current, an alternating current, or a current that alternates between a direct current and an alternating current. In this way, a proper current may be selected depending on an actual case, for injection.

With reference to the first implementation of the first aspect, in a second implementation of the first aspect, the injecting a rectification current into a positive or negative electrode of the to-be-rectified photovoltaic module includes: determining a value of the rectification current for the to-be-rectified photovoltaic module and a length of a rectification time period of the to-be-rectified photovoltaic module; and injecting the current into the to-be-rectified photovoltaic module based on the determined value of the rectification current and the determined length of the rectification time period.

With reference to the second implementation of the first aspect, in a third implementation of the first aspect, the value of the rectification current is a specified value or changes dynamically.

With reference to the third implementation of the first aspect, in a fourth implementation of the first aspect, when the rectification current is provided by a direct current, the value of the rectification current is determined by using the following formula: $I_1=a+bI_2+cI_2^2+dI_2^3$, where $I_1$ is the value of the rectification current, $I_2$ is a sum of currents of other photovoltaic module strings that are connected to a same inverter circuit as a photovoltaic module string that includes the to-be-rectified photovoltaic module in the photovoltaic power station, a, b, c, and d are specified coefficients, $50 \geq a \geq 5$, $10 \geq b \geq -10$, $0.5 \geq c \geq -0.5$, and $0.1 \geq d \geq -4.1$.

In this implementation, it is specified how to determine the value of the rectification current when another photovoltaic module string that can work normally in the photovoltaic power station provides a direct current with a variable value.

With reference to the third implementation of the first aspect, in a fifth implementation of the first aspect, when the rectification current is provided by a direct current and the value of the rectification current is the specified value, a value range of the rectification current is 1-100 A. In this implementation, when a constant direct current is used, a value range of the current is specified. Injecting the current within the range ensures a photovoltaic module degradation rectification effect.

With reference to the third implementation of the first aspect, in a sixth implementation of the first aspect, when the rectification current is provided by an alternating current, a voltage range of the alternating current is 20-3000 V, a range of a valid current value of the alternating current is 1-100 A, and a period range of the alternating current is $2 \times 10^{-10}$-$2 \times 10^3$ s. In this implementation, a value of the alternating current used as rectification current is specified. Injection performed by using the alternating current with the parameter ensures a photovoltaic module degradation rectification effect.

With reference to any one of the second implementation to the sixth implementation of the first aspect, in a seventh implementation of the first aspect, a range of the rectification time period is 0.1-100 h. Injecting the rectification current into the photovoltaic module within the rectification time period can ensure a relatively good rectification effect.

It should be noted that the rectification time period is a total rectification time period. That is, if the rectification current is injected at a time, the rectification time period is a time period of the one-time injection of the rectification current. If the rectification current is injected for two or more times, the rectification time period is a sum of time periods of the two or more times of injection of the rectification current.

With reference to any one of the second implementation to the sixth implementation of the first aspect, in an eighth implementation of the first aspect, the injecting the current into the to-be-rectified photovoltaic module based on the determined value of the rectification current and the determined length of the rectification time period includes: controlling another photovoltaic module string connected to an inverter circuit to which the photovoltaic module string that includes the to-be-rectified photovoltaic module is connected, to inject the current into the to-be-rectified photovoltaic module; or controlling a current of a converging module in an inverter circuit to which the photovoltaic module string that includes the to-be-rectified photovoltaic module is connected, to be injected into the to-be-rectified photovoltaic module; or controlling a direct-current side of an inverter circuit to which the photovoltaic module string that includes the to-be-rectified photovoltaic module is connected, to inject the current into the to-be-rectified photovoltaic module; or controlling a current on an alternating-current side of an inverter circuit to which the photovoltaic module string that includes the to-be-rectified photovoltaic module is connected, to be input into a rectifier circuit, and controlling an output end of the rectifier circuit to inject the current into the to-be-rectified photovoltaic module; or controlling an alternating-current side of an inverter circuit to which the photovoltaic module string that includes the to-be-rectified photovoltaic module is connected, to inject the current into the to-be-rectified photovoltaic module; or injecting the current into the to-be-rectified photovoltaic module by using an external power supply; or injecting the current into the to-be-rectified photovoltaic module by using a power device.

In this implementation, a plurality of rectification current providing manners are provided and are categorized into two types: One is to provide the rectification current by using another photovoltaic module string that works normally, where this implementation is mainly applied to a scenario in which the another photovoltaic module string that works normally can generate power, and the other is to provide the rectification current by using an external power supply, where this implementation is applicable to any scenario. Each of the implementations can be used to complete degradation rectification of the photovoltaic module, and each implementation is not complicated.

In actual application, when a direct current is used for rectification, a positive electrode of the another photovoltaic module string is connected to a positive electrode of the photovoltaic module string that includes the to-be-rectified photovoltaic module, and a negative electrode of the another photovoltaic module string is connected to a negative electrode of the photovoltaic module string that includes the to-be-rectified photovoltaic module. Alternatively, a positive electrode (an output end) of the converging module in the inverter circuit is connected to a positive electrode of the photovoltaic module string that includes the to-be-rectified photovoltaic module, and a negative electrode (an output end) of the converging module in the inverter circuit is connected to a negative electrode of the photovoltaic module string that includes the to-be-rectified photovoltaic module. Alternatively, a positive electrode of the direct-current side of the inverter circuit is connected to a positive electrode of the photovoltaic module string that includes the to-be-rectified photovoltaic module, and a negative electrode of the direct-current side of the inverter circuit is connected to a negative electrode of the photovoltaic module string that includes the to-be-rectified photovoltaic module. Alternatively, a positive electrode of the external power supply is connected to a positive electrode of the photovoltaic module string that includes the to-be-rectified photovoltaic module, and a negative electrode of the external power supply is connected to a negative electrode of the photovoltaic module string that includes the to-be-rectified photovoltaic module. Alternatively, a positive electrode of the power device is connected to a positive electrode of the photovoltaic module string that includes the to-be-rectified photovoltaic module, and a negative electrode of the power device is connected to a negative electrode of the photovoltaic module string that includes the to-be-rectified photovoltaic module.

The controlling a current on an alternating-current side of an inverter circuit to which the photovoltaic module string that includes the to-be-rectified photovoltaic module is connected, to be input into a rectifier circuit, and controlling an output end of the rectifier circuit to inject the current into the to-be-rectified photovoltaic module may be implemented by: controlling the current on the alternating-current side of the inverter circuit to which the photovoltaic module string that includes the to-be-rectified photovoltaic module is connected, to be input into the rectifier circuit, adjusting the current input into the rectifier circuit, by adjusting voltage or power of the rectifier circuit, and controlling the output end of the rectifier circuit to inject the adjusted current into the to-be-rectified photovoltaic module.

The injecting the current into the to-be-rectified photovoltaic module by using an external power supply may be implemented by: applying voltage to the positive or negative electrode of the to-be-rectified photovoltaic module by using the external power supply, so that a direct current or an alternating current is generated inside the to-be-rectified photovoltaic module.

The injecting the current into the to-be-rectified photovoltaic module by using a power device may be implemented by: applying power to the positive or negative electrode of the to-be-rectified photovoltaic module by using the power device, so that a direct current or an alternating current is generated inside the to-be-rectified photovoltaic module.

With reference to any one of the second implementation to the sixth implementation of the first aspect, in a ninth implementation of the first aspect, the method further includes: determining current environment information, where the current environment information includes at least one of an ambient temperature, a wind speed, and a solar light intensity; and adjusting the determined value of the rectification current and the determined length of the rectification time period based on the current environment information.

With reference to the ninth implementation of the first aspect, in a tenth implementation of the first aspect, the adjusting the determined value of the rectification current and the determined length of the rectification time period based on the current environment information includes: when the ambient temperature is greater than a specified temperature value or the wind speed is less than a specified wind speed value or the solar light intensity is greater than a specified light intensity value, decreasing the current value of the rectification current or decreasing the length of the rectification time period; or when the ambient temperature is less than a specified temperature value or the wind speed is greater than a specified wind speed value or the solar light intensity is less than a specified light intensity value, increasing the current value of the rectification current or increasing the length of the rectification time period.

In the foregoing implementations, how to select the value of the rectification current with reference to the current environment information is specified. Based on the environment information, an amount of heat generated in a rectification process just satisfies a rectification requirement. This avoids incomplete rectification caused by insufficient heat and a waste of energy caused by excessive heat.

According to a second aspect, an embodiment of this disclosure provides an apparatus for rectifying degradation of a photovoltaic module in a photovoltaic power station, where the apparatus for rectifying degradation of a photovoltaic module in a photovoltaic power station includes the units configured to implement the method provided in any possible implementation in the first aspect, for example, a control unit and a rectification unit.

DESCRIPTION OF EMBODIMENTS

To make the objectives, technical solutions, and advantages of this disclosure clearer, the following further describes the implementations of this disclosure in detail with reference to the accompanying drawings.

Figure 1:
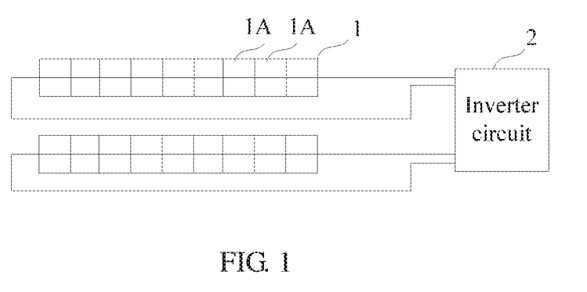
FIG. 1 is a schematic structural diagram of a photovoltaic power station according to an embodiment of this disclosure.

For ease of the following description, the following first describes a structure of a photovoltaic power station with reference to FIG. 1.

As shown in FIG. 1, the photovoltaic power station includes a photovoltaic module string 1 and an inverter circuit 2. The photovoltaic module string 1 is configured to convert solar energy into electric energy and output a direct current to the inverter circuit 2. The inverter circuit 2 converts the direct current into an alternating current and then outputs the alternating current to a power grid. Each inverter circuit 2 may be connected to a plurality of photovoltaic module strings 1 simultaneously. The plurality of photovoltaic module strings 1 are connected in parallel. Each photovoltaic module string 1 includes at least one photovoltaic module 1A (also referred to as a solar panel). When the photovoltaic module string 1 includes at least two photovoltaic modules 1A, the at least two photovoltaic modules 1A are serially connected, and an output end of the at least two serially connected photovoltaic modules 1A is electrically connected to a direct-current side of the inverter circuit to output a direct current to the direct-current side of the inverter circuit. In this embodiment of this disclosure, for photovoltaic module rectification, there may be one or more photovoltaic modules that need to be rectified, which are usually all photovoltaic modules in a photovoltaic module string.

The inverter circuit may be a centralized inverter or a string inverter. The centralized inverter includes a converging module, an inverter module, and a transformer. The string inverter includes an inverter module and a transformer. A main role of the converging module is to converge output currents of a plurality of photovoltaic module strings 1 and then inputting the converged currents into the inverter module. Certainly, the inverter modules of the foregoing two structures are merely examples. The inverter circuit in this embodiment of this disclosure may alternatively be implemented by using an inverter module of another structure, and this is not limited in this disclosure. In addition, besides the photovoltaic module string 1 and the inverter circuit 2, the photovoltaic power station may further include other circuit structures, for example, a Maximum Power Point Tracking (MPPT) circuit.

Figure 2:
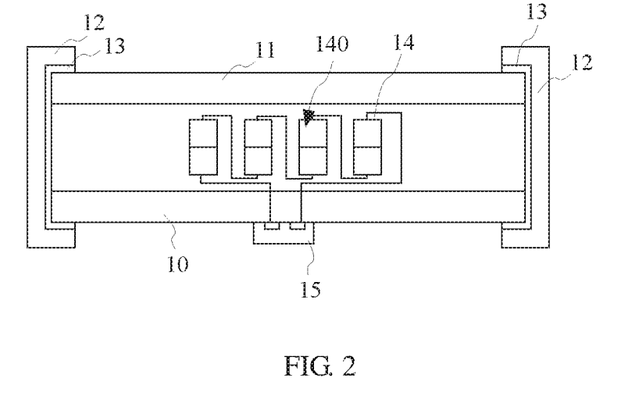
FIG. 2 is a schematic structural diagram of a photovoltaic module according to an embodiment of this disclosure.

FIG. 2 is a schematic structural diagram of a photovoltaic module. As shown in FIG. 2, the photovoltaic module includes a backplane 10, encapsulation glass 11 opposite to the backplane 10, a frame 12 disposed surrounding the backplane 10 and the encapsulation glass 11, a sealing material 13 used for sealing between the frame 12 and the backplane 10 and between the frame 12 and the encapsulation glass 11, a cell string 14 disposed between the backplane 10 and the encapsulation glass 11, and a connection box 15 disposed on an outer wall of the backplane 10. The backplane 10, the encapsulation glass 11, and the frame 12 cooperate to form a sealed cavity, and the cell string 14 is disposed in the cavity. The cell string 14 includes a plurality of cells 140. Each cell 140 includes a positive electrode and a negative electrode. The plurality of cells 140 are connected sequentially to form the cell string 14. Two ends of the cell string 14 are a positive electrode and a negative electrode. The connection box 15 includes two terminals, and the two terminals are respectively connected to the positive electrode and the negative electrode of the cell string 14. The encapsulation glass 11 may be made of reinforced glass, and the sealing material 13 may be made of an ethylene-vinyl acetate copolymer (EVA).

Once made, the photovoltaic module is always in a degradation state, greatly reducing power generation efficiency of the photovoltaic module. Degradation of the photovoltaic module is a decrease in an output power of the photovoltaic module. Factors that cause degradation of the photovoltaic module include initial Light induced Degradation (LID) of the module, material aging degradation of the module, Potential Induced Degradation (PID), degradation caused by an external environment or a destructive factor, and the like. The following describes in detail several degradation masons.

A reason for initial LID of a module is as follows: A photovoltaic module is usually made by using a p-type boron-doped silicon base and a corresponding cell technology. Under light, an oxygen element and a boron element in the silicon base react to generate a defect, resulting in a decrease in an output power of the photovoltaic module. Light-induced degradation usually occurs within one year after the photovoltaic module is installed, resulting in a rapid decrease in an output power of the photovoltaic module in the early stage. An amplitude of an output power decrease caused by light-induced degradation is related to a material of the silicon base and the cell technology. For example, an amplitude of light-induced degradation of a module with a p-type monocrystalline cell using an aluminum back surface field technology is about 3%, an amplitude of light-induced degradation of a module with a p-type polycrystalline cell using an aluminum back surface field technology is about 2%, an amplitude of light-induced degradation of a module with a p-type monocrystalline cell using a Passivated emitter rear contact (PERC) technology is about 4%, and an amplitude of light-induced degradation of a module with a p-type polycrystalline cell using a PERC technology is even up to 10% due to relatively high metal impurity content.

A reason for material aging degradation of a module is as follows: Performance of materials of all parts of a photovoltaic module gradually decreases with an increase of a usage time, resulting in a decrease in an output power of the photovoltaic module. Because trace gases and moisture are generated when an ethylene-vinyl acetate copolymer (only for a photovoltaic module whose sealing material uses an ethylene-vinyl acetate copolymer) is decomposed, and moisture outside the photovoltaic module also penetrates into the photovoltaic module, the moisture not only corrodes electrodes and interconnection parts (interconnection parts between cells in a cell string) of the cell string, but also causes effect degeneration of passivation layers ($SiO$, $SiN_x$, or $Al_2O_3$) in the cells, resulting in a sharp decrease in the output power of the photovoltaic module.

A reason for potential induced degradation is as follows: A frame of a photovoltaic module needs to be grounded, causing hundreds or even thousands of volts of potential difference between a negative electrode of a cell string and the frame. Under the action of the potential difference, alkaline metal ions (for example, sodium ions) in the encapsulation glass (reinforced glass) migrate towards the cell string. When the alkaline metal ions enter the cell string (for example, the negative electrode of the cell string), an output power of the photovoltaic module is greatly decreased.

Usually, the photovoltaic module degrades most in the first year after installation, and an amplitude of degradation may be even up to 3%. In the following years, an amplitude of degradation usually does not exceed 0.8% each year. A total amplitude of degradation in 25 years does not exceed 20%. Power degradation of the photovoltaic module directly affects output of the photovoltaic module because an electric energy yield of the photovoltaic module decreases with power degradation of the photovoltaic module. In addition, due to different degrading degrees of photovoltaic modules, the photovoltaic modules cannot work at a maximum power, resulting in an additional loss of 3-5% of an electric energy yield.

To eliminate a power generation capacity loss caused by degradation of a photovoltaic module, a module rectification method is provided in a related technology. The method is mainly used to rectify potential induced degradation. The specific rectification method is: applying voltage to a frame of a photovoltaic module and a positive electrode (or a negative electrode) of a cell string, to form a negative bias between the frame and the negative electrode of the cell string, and provide energy to alkaline metal ions that have migrated into the cell string, so that the alkaline metal ions return to outside of the cell string, thereby rectifying potential induced degradation. The method can rectify potential induced degradation to some extent, but cannot rectify degradation of the photovoltaic module such as initial light-induced degradation of the module and material aging degradation of the module. Consequently, a great power generation capacity loss is still caused by degradation of the photovoltaic module. In addition, when voltage is applied to the positive electrode (or the negative electrode) of the cell string, terminals of the connection box in the photovoltaic module need to be disconnected, to implement electrical connection between a rectification-voltage providing device and the positive electrode (or the negative electrode) of the cell string. In this case, a terminal damage and a secondary fault are prone to occur.

To resolve a problem in the related technology, an embodiment of this disclosure provides a method for rectifying degradation of a photovoltaic module in a photovoltaic power station. For a related method process, refer to the following description.

Figure 3:
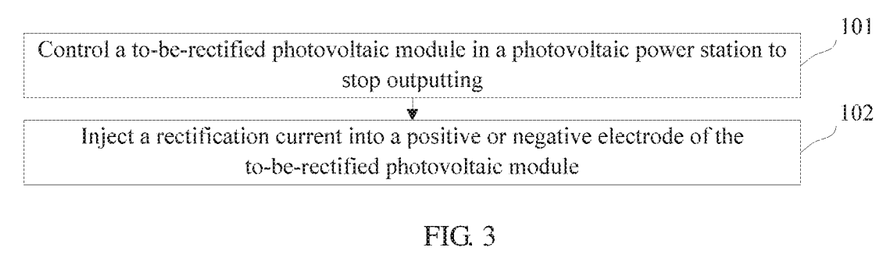
FIG. 3 is a flowchart of a method for rectifying degradation of a photovoltaic module in a photovoltaic power station according to an embodiment of this disclosure.

FIG. 3 is a flowchart of a method for rectifying degradation of a photovoltaic module in a photovoltaic power station according to an embodiment of this disclosure. The method is applied to the foregoing degradation rectification of a photovoltaic module in a photovoltaic power station. Referring to FIG. 3, the method includes the following steps.

Step 101: Control a to-be-rectified photovoltaic module in a photovoltaic power station to stop outputting, where the to-be-rectified photovoltaic module includes one photovoltaic module or at least two serially-connected photovoltaic modules.

That a to-be-rectified photovoltaic module stops outputting means that a current generated in the to-be-rectified photovoltaic module cannot be output to a power grid or another electric device through an inverter circuit.

For example, the controlling a to-be-rectified photovoltaic module in the photovoltaic power station to stop outputting may be controlling a circuit of the to-be-rectified photovoltaic module in the photovoltaic power station to be broken. The controlling a circuit of the to-be-rectified photovoltaic module in the photovoltaic power station to be broken means disconnecting a photovoltaic module string that includes the to-be-rectified photovoltaic module from the inverter circuit in the photovoltaic power station.

For another example, another current is controlled to be directly injected into the to-be-rectified photovoltaic module, so that the to-be-rectified photovoltaic module stops outputting. In this case, step 101 and step 102 are in essence one step.

Step 102: Inject a rectification current into a positive or negative electrode of the to-be-rectified photovoltaic module.

The injecting a rectification current into a positive or negative electrode of the to-be-rectified photovoltaic module is inputting the current into the to-be-rectified photovoltaic module through the positive electrode and the negative electrode of the photovoltaic module.

When the rectification current is injected into the to-be-rectified photovoltaic module, the rectification current may be directly injected into a photovoltaic module string that includes the to-be-rectified photovoltaic module. The current injection means electrically connecting a power supply that provides the rectification current, directly to an output end of the photovoltaic module string that includes the to-be-rectified photovoltaic module, so as to inject the rectification current into the to-be-rectified photovoltaic module.

Step 101 and step 102 are performed to inject the current into the photovoltaic module, implementing degradation rectification.

The following describes a principle of rectifying degradation by injecting the current: (1) After the rectification current is injected, an active center that causes light-induced degradation inside the photovoltaic module reacts with an injected nonequilibrium electron and hole, to change to a state in which degradation does not occur, rectifying degradation that occurs originally under light. In this way, initial light-induced degradation of the module is rectified. (2) After the rectification current is injected, a temperature inside the photovoltaic module increases dramatically, and moisture inside the photovoltaic module can be discharged. This prevents the moisture from corroding the electrodes and interconnection parts of the cell string and also avoids a power decrease caused by a leakage current generated due to the moisture on the electrodes and the interconnection parts of the cell string. In addition, with the injected rectification current, a spatial structure of a passivation layer can be recovered to an original state under combined action of the temperature and the current, and a passivation effect of the passivation layer is recovered, rectifying material aging degradation of the module. (3) After the rectification current is injected, a relatively high potential difference is generated between the positive electrode and the negative electrode of the photovoltaic module, to separate, from the cell string, alkaline metal ions that have entered the cell string originally, rectifying potential induced degradation to some extent. (4) After the rectification current is injected, some defects (for example, a boron-oxygen complex or an iron-boron pair) that exist in a cell encapsulated in the photovoltaic module are dissolved by the current, to eliminate the defects that have a recombination activity originally, so as to recover part of performance that has been degraded. In this way, degradation of the photovoltaic module caused by another reason is rectified. To sum up, in this embodiment of this disclosure, using this method to rectify the photovoltaic module can rectify initial light-induced degradation of the module, material aging degradation of the module, potential induced degradation, and degradation of the photovoltaic module caused by another reason (for example, an external environment or a destructive factor).

Figure 4:
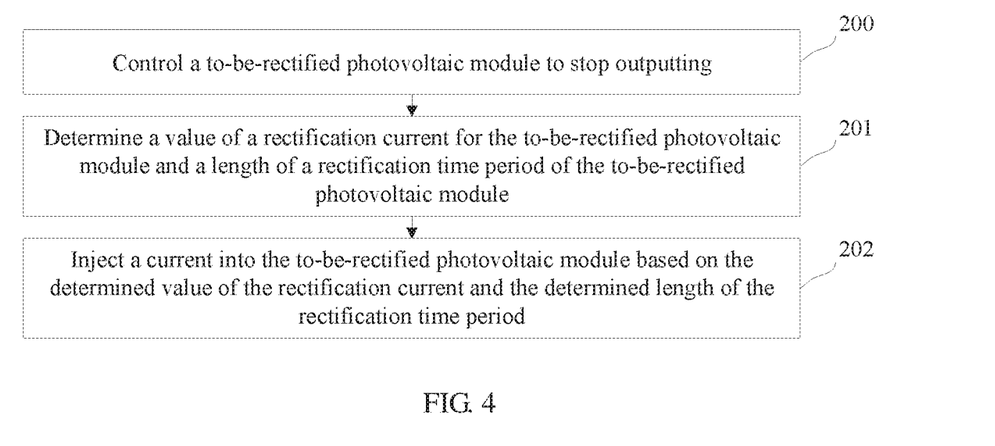
FIG. 4 is a flowchart of another method for rectifying degradation of a photovoltaic module in a photovoltaic power station according to an embodiment of this disclosure.

FIG. 4 is a flowchart of another method for rectifying degradation of a photovoltaic module in a photovoltaic power station according to an embodiment of this disclosure. Referring to FIG. 4, the method includes the following steps.

Step 200: Control a to-be-rectified photovoltaic module to stop outputting.

That a to-be-rectified photovoltaic module stops outputting means that a current generated in the to-be-rectified photovoltaic module cannot be output to a power grid or another electric device through an inverter circuit.

For example, the controlling a to-be-rectified photovoltaic module in the photovoltaic power station to stop outputting may be controlling a circuit of the to-be-rectified photovoltaic module in the photovoltaic power station to be broken.

In this embodiment of this disclosure, the controlling a circuit of the to-be-rectified photovoltaic module in the photovoltaic power station to be broken may include: disconnecting a photovoltaic module string that includes the to-be-rectified photovoltaic module from an inverter circuit of the photovoltaic power station for a period of time, so that the photovoltaic module is in a relative stable state when being rectified.

The disconnecting a photovoltaic module string from the inverter circuit may be: controlling a switch in a circuit connecting the photovoltaic module string to the inverter circuit to be turned off. The switch may be located between the inverter circuit and the photovoltaic module string, or may be located in the inverter circuit. For a specific location, refer to detailed descriptions of a circuit in the following. The photovoltaic module string may be disconnected by controlling the switch to be turned off, thereby disconnecting the to-be-rectified photovoltaic module in the photovoltaic module string.

A circuit breaking time period of the to-be-rectified photovoltaic module may be set as needed, for example, 0.1-10 h.

For another example, another current is controlled to be directly injected into the to-be-rectified photovoltaic module, so that the to-be-rectified photovoltaic module stops outputting. In this case, step 200 and step 203 are in essence one step.

Step 201: Determine a value of a rectification current for the to-be-rectified photovoltaic module and a length of a rectification time period of the to-be-rectified photovoltaic module.

The determining a value of a rectification current for the to-be-rectified photovoltaic module means determining the value of the rectification current when the photovoltaic module is being rectified and a type of the rectification current is specified. The rectification time period of the photovoltaic module is duration for injecting the current when the photovoltaic module is being rectified.

It should be noted that step 201 is an optional step. In an implementation, a default value of the rectification current and a default length of the rectification time period may be set. In rectification, the default value of the rectification current and the default length of the rectification time period may be used to perform step 202.

The rectification current may be provided by using a direct current, an alternating current, or a current that alternates between a direct current and an alternating current. The current that alternates between the direct current and the alternating current means that the rectification time period is divided into at least two segments, and types of currents injected within any two adjacent time segments are different. For example, the rectification time period is divided into three segments, and a direct-current rectification current, an alternating-current rectification current, and a direct-current rectification current are injected in the three time segments sequentially.

In this embodiment of this disclosure, there may be two rectification current providing manners: One is to use, as the rectification current, a current provided by another photovoltaic module string that is connected to a same inverter circuit as the photovoltaic module string that includes the to-be-rectified photovoltaic module in the photovoltaic power station, and the other is to use a current generated by an external power supply as the rectification current.

In this embodiment of this disclosure, the value of the rectification current may be a specified value, or may change dynamically. The dynamic change means that the value of the rectification current may be adjusted in real time.

In an implementation of this embodiment of this disclosure, the rectification current is provided by a direct current. That is, the rectification current is the direct current, and the value of the rectification current changes dynamically.

When a current of another photovoltaic module string that is connected to a same inverter circuit as the photovoltaic module string that includes the to-be-rectified photovoltaic module in the photovoltaic power station is used as the rectification current, the determining a value of a rectification current for the photovoltaic module includes:

determining the value of the rectification current by using the following formula:

$$I_1 = a + bI_2 + cI_2^2 + dI_2^3, \text{ where}$$

$I_1$ is the value of the rectification current, $I_2$ is a sum of currents of other photovoltaic module strings that are connected to a same inverter circuit as the photovoltaic module string that includes the to-be-rectified photovoltaic module in the photovoltaic power station, a, b, c, and d are specified coefficients, $50 \geq a \geq 5$, $10 \geq b \geq -10$, $0.5 \geq c \geq -0.5$, and $0.1 \geq d \geq -0.1$.

The foregoing formula is an empirical formula. For ease of calculation, the foregoing formula may be simplified. For example, the formula may approximate to $(30-I_2/0.9)$ A or $(25-I_2/0.8)$ A.

Further, when the rectification current changes with a current of the another photovoltaic module string connected to the same inverter circuit as the photovoltaic module string that includes the to-be-rectified photovoltaic module, the method includes: sampling the current of the another photovoltaic module string connected to the same inverter circuit as the photovoltaic module string that includes the to-be-rectified photovoltaic module in the photovoltaic power station; and calculating a size of a real-time rectification current based on the sampled current and the foregoing formula.

In another implementation of this embodiment of this disclosure, the rectification current is a direct current, and the value of the rectification current maintains unchanged in one rectification process, and is the foregoing specified value. Values of rectification currents used in different rectification processes of a same photovoltaic module may be the same or may be different. Values of rectification currents used for rectification of different photovoltaic modules may be the same or may be different. However, the values of the rectification currents need to satisfy a specified range.

A value range of the rectification current is 1-100 A. Further, the value range of the rectification current is 2-36 A. Still further, the value range of the rectification current is 5-30 A.

In this embodiment of this disclosure, when the rectification current is provided by an alternating current, that is, when the rectification current is the alternating current, a voltage range of the alternating current is 20-3000 V, a range of a valid current value of the alternating current is 1-100 A, and a period range of the alternating current is $2\times10^{-10}$-$2\times10^3$ s.

Specifically, the rectification current may be an alternating-current pulse current, a pulse width range is $10^{-10}$-$10^3$ s, a pulse period range is $2\times10^{-10}$-$2\times10^3$ s, a pulse amplitude range is 20-3000 V, and a valid current value of the alternating-current pulse current is 1-100 A.

In this embodiment of this disclosure, the rectification time period may be a specified value. A range of the rectification time period is 0.1-100 h. For example, the range of the rectification time period may be 0.5-10 h. If the time period is excessively short, a rectification effect is relatively poor. If the rectification time period is excessively long, time and resources are wasted. It should be noted that the rectification time period is a total rectification time period. That is, if the rectification current is injected at a time, the rectification time period is a time period of the one-time injection of the rectification current. If the rectification current is injected for two or more times, the rectification time period is a sum of time periods of the two or more times of injection of the rectification current. For example, the rectification current is injected for three times, and each injection time period is 1 h; the rectification time period is 3 h.

Further, for determining of the value of the rectification current for the photovoltaic module and determining of the length of the rectification time period, an external environment of the to-be-rectified photovoltaic module may be further considered. To be specific, the method may further include: determining current environment information, where the current environment information includes at least one of an ambient temperature, a wind speed, and a solar light intensity; adjusting the determined value of the rectification current and the determined length of the rectification time period based on the current environment information; and performing the following steps by using an adjusted value of the rectification current and an adjusted length of the rectification time period.

For example, when the ambient temperature is greater than a specified temperature value or the wind speed is less than a specified wind speed value or the solar light intensity is greater than a specified light intensity value, the current value of the rectification current is decreased or the length of the rectification time period is decreased; or when the ambient temperature is less than a specified temperature value or the wind speed is greater than a specified wind speed value or the solar light intensity is less than a specified light intensity value, the current value of the rectification current is increased or the length of the rectification time period is increased. In the foregoing process, a condition for decreasing the current value of the rectification current or the length of the rectification time period may be any combination of that the ambient temperature is greater than a specified temperature value, that the wind speed is less than a specified wind speed value, and that the solar light intensity is greater than a specified light intensity value, and a condition for increasing the current value of the rectification current or the length of the rectification time period may be any combination of that the ambient temperature is less than a specified temperature value, that the wind speed is greater than a specified wind speed value, and that the solar light intensity is less than a specified light intensity value.

Optionally, a larger wind speed indicates a larger rectification current or a longer rectification time period. A lower ambient temperature or a smaller solar light intensity indicates a larger rectification current and a longer rectification time period. This is because when a same current is used, if the ambient temperature is higher, the wind speed is smaller, and the solar light intensity is larger, a temperature inside the photovoltaic module is higher, and degradation rectification is completed faster.

Further, the rectification current may be a current that alternates between a direct current and an alternating current. When to use the direct current or when to use the alternating current may be determined based on a real-time ambient temperature. To be specific, the determining a value of a rectification current for the photovoltaic module may include: determining a real-time ambient temperature; and determining, based on the real-time ambient temperature, an alternating current or a direct current to serve as a currently input rectification current. For example, the direct current is used when the real-time ambient temperature is greater than or equal to a threshold; the alternating current is used when the real-time ambient temperature is less than or equal to the threshold, because the alternating current can generate more heat. For a value of the current that alternates between a direct current and an alternating current, values of the direct current and the alternating current that are used may be determined in the foregoing manner.

Step 202: Inject a current into the to-be-rectified photovoltaic module based on the determined value of the rectification current and the determined length of the rectification time period.

In this embodiment of this disclosure, the injecting a current into the to-be-rectified photovoltaic module based on the determined value of the rectification current and the determined length of the rectification time period may include:

controlling another photovoltaic module string connected to an inverter circuit to which the photovoltaic module string that includes the to-be-rectified photovoltaic module is connected, to inject the current into the to-be-rectified photovoltaic module; or controlling a current of a converging module in an inverter circuit to which the photovoltaic module string that includes the to-be-rectified photovoltaic module is connected, to be injected into the to-be-rectified photovoltaic module; or controlling a direct-current side of an inverter circuit to which the photovoltaic module string that includes the to-be-rectified photovoltaic module is connected, to inject the current into the to-be-rectified photovoltaic module; or controlling a current on an alternating-current side of an inverter circuit to which the photovoltaic module string that includes the to-be-rectified photovoltaic module is connected, to be input into a rectifier circuit, and controlling an output end of the rectifier circuit to inject the current into the to-be-rectified photovoltaic module; or controlling an alternating-current side of an inverter circuit to which the photovoltaic module string that includes the to-be-rectified photovoltaic module is connected, to inject the current into the to-be-rectified photovoltaic module; or injecting the current into the to-be-rectified photovoltaic module by using an external power supply; or injecting the current into the to-be-rectified photovoltaic module by using a power device.

In actual application, when a direct current is used for rectification, a positive electrode of the another photovoltaic module string is connected to a positive electrode of the photovoltaic module string that includes the to-be-rectified photovoltaic module, and a negative electrode of the another photovoltaic module string is connected to a negative electrode of the photovoltaic module string that includes the to-be-rectified photovoltaic module. Alternatively, a positive electrode (an output end) of the converging module in the inverter circuit is connected to a positive electrode of the photovoltaic module string that includes the to-be-rectified photovoltaic module, and a negative electrode (an output end) of the converging module in the inverter circuit is connected to a negative electrode of the photovoltaic module string that includes the to-be-rectified photovoltaic module. Alternatively, a positive electrode of the direct-current side of the inverter circuit is connected to a positive electrode of the photovoltaic module string that includes the to-be-rectified photovoltaic module, and a negative electrode of the direct-current side of the inverter circuit is connected to a negative electrode of the photovoltaic module string that includes the to-be-rectified photovoltaic module. Alternatively, a positive electrode of the external power supply is connected to a positive electrode of the photovoltaic module string that includes the to-be-rectified photovoltaic module, and a negative electrode of the external power supply is connected to a negative electrode of the photovoltaic module string that includes the to-be-rectified photovoltaic module. Alternatively, a positive electrode of the power device is connected to a positive electrode of the photovoltaic module string that includes the to-be-rectified photovoltaic module, and a negative electrode of the power device is connected to a negative electrode of the photovoltaic module string that includes the to-be-rectified photovoltaic module.

Figure 5A:
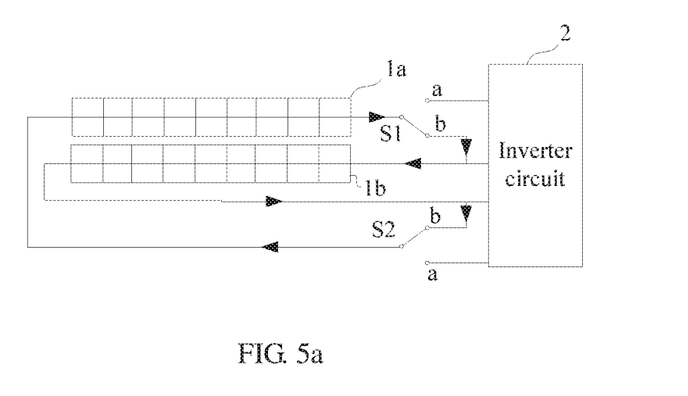
FIG. 5a is a schematic structural diagram of a photovoltaic power station according to an embodiment of this disclosure.

The controlling another photovoltaic module string connected to an inverter circuit to which the photovoltaic module string that includes the to-be-rectified photovoltaic module is connected, to inject the current into the to-be-rectified photovoltaic module may be implemented in the following manner: controlling a rectification switch to make the current of the another photovoltaic module string flow to the photovoltaic module string that includes the to-be-rectified photovoltaic module, where the rectification switch may be disposed between the inverter circuit and the photovoltaic module string. The following describes the implementation with reference to FIG. 5a. FIG. 5a is a schematic structural diagram of a photovoltaic power station. FIG. 5a shows only two photovoltaic module strings. A photovoltaic power station may include more photovoltaic module strings actually, and a circuit between any two photovoltaic module strings in the photovoltaic power station may be disposed according to such a circuit actually. As shown in FIG. 5a, 1b is a photovoltaic module string that includes a to-be-rectified photovoltaic module, 1a is a photovoltaic module string that provides a rectification current, and a rectification switch is disposed between the photovoltaic module string 1a and an inverter circuit 2 and includes a selection switch S1 and a selection switch S2. When the selection switches S1 and S2 are connected to contacts a, the photovoltaic module string 1a is connected to an input end of the inverter circuit 2, to output a current of the photovoltaic module string 1a. When the selection switches S1 and S2 are connected to contacts b, the photovoltaic module string 1a is connected to the photovoltaic module string 1b including the to-be-rectified photovoltaic module, so that the photovoltaic module string 1a injects the current into the to-be-rectified photovoltaic module (as shown by an arrow in FIG. 5a). A structure shown in FIG. 5a is merely an example. In implementation, a selection switch may be further disposed between the photovoltaic module string 1b including the to-be-rectified photovoltaic module and the inverter circuit 2. The selection switch is used to control the photovoltaic module string that includes the to-be-rectified photovoltaic module to be electrically connected to the inverter circuit or another photovoltaic module string, to inject the rectification current.

It should be noted that before the photovoltaic module string 1a is connected to the photovoltaic module string 1b including the to-be-rectified photovoltaic module, the inverter circuit may be further used to control the photovoltaic module string 1b to be disconnected from the inverter circuit, that is, step 200 is performed. In other subsequent implementations, the method may be used to perform step 200.

Figure 5B:
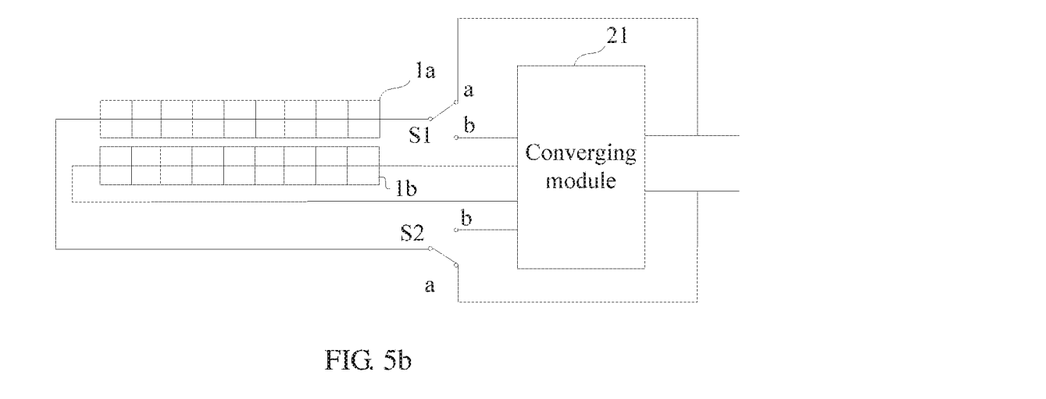
FIG. 5b is a schematic structural diagram of another photovoltaic power station according to an embodiment of this disclosure.

The controlling a current of a converging module in an inverter circuit to which the photovoltaic module string that includes the to-be-rectified photovoltaic module is connected, to be injected into the to-be-rectified photovoltaic module may be implemented in the following manner: controlling a rectification switch to make the output current of the converging module flow to the photovoltaic module string that includes the to-be-rectified photovoltaic module, where the rectification switch may be disposed between an input end of the converging module and the photovoltaic module string. The following describes the implementation with reference to FIG. 5b. FIG. 5b is a schematic structural diagram of a photovoltaic power station. FIG. 5b shows only two photovoltaic module strings. A photovoltaic power station may include more photovoltaic module strings actually, and each photovoltaic module string may be disposed according to a circuit of the photovoltaic module string a. As shown in FIG. 5b, 1a is a photovoltaic module string that includes a to-be-rectified photovoltaic module, and a rectification switch is disposed between the photovoltaic module string 1a and an input end of a converging module 21 in the inverter circuit and includes a selection switch S1 and a selection switch S2. When the selection switches S1 and S2 are connected to contacts a, the photovoltaic module string 1a is connected to an output end of the converging module 21, so that the output end of the converging module 21 injects a current into the to-be-rectified photovoltaic module. When the selection switches S1 and S2 are connected to contacts b, the photovoltaic module string 1b is connected to an output end of the converging module 21, to output a current of the photovoltaic module string. It should be noted that the inverter circuit in this embodiment of this disclosure may be a centralized inverter or a string inverter, and the converging module exists only in the centralized inverter. Therefore, the converging module can be used to inject a current only when the inverter circuit is a centralized inverter.

It should be noted that before the photovoltaic module string 1a including the to-be-rectified photovoltaic module is controlled to connect to the output end of the converging module 21, a switch in the converging module may be further used to control the photovoltaic module string 1a to be disconnected from the inverter circuit, that is, step 200 is performed.

The controlling a direct-current side of an inverter circuit to which the photovoltaic module string that includes the to-be-rectified photovoltaic module is connected, to inject the current into the to-be-rectified photovoltaic module may be implemented in the following manner controlling a short-circuit switch in the inverter circuit to be turned on or short-circuiting a diode in the inverter circuit, so that a current on the direct-current side of the inverter circuit flows to the photovoltaic module string that includes the to-be-rectified photovoltaic module. Both the short-circuit switch and the diode are original structures of the inverter circuit. The short-circuit switch can short-circuit the photovoltaic module string that includes the to-be-rectified photovoltaic module and another module string, to implement an electrical connection. An original role of the diode is to prevent current backflow. However, in this embodiment, a switch needs to be connected to the diode in parallel to inject a current into the to-be-rectified photovoltaic module, and the diode becomes short-circuited by controlling the switch to be turned on, to inject the current on the direct-current side into the to-be-rectified photovoltaic module.

When an alternating-current side of an inverter circuit to which the photovoltaic module string that includes the to-be-rectified photovoltaic module is connected is controlled to inject the current into the to-be-rectified photovoltaic module, a rectification circuit needs to be disposed between the alternating-current side of the inverter circuit and the photovoltaic module string that includes the to-be-rectified photovoltaic module, to connect the alternating-current side of the inverter circuit to the photovoltaic module string. A switch is disposed in the rectification circuit and is configured to control on/off of the rectification circuit. When the switch is turned on, the alternating-current side of the inverter circuit injects the current into the to-be-rectified photovoltaic module. In this implementation, a filter may be further disposed in the rectification circuit to perform filtering on an output by the alternating-current side.

When a current on an alternating-current side of an inverter circuit to which the photovoltaic module string that includes the to-be-rectified photovoltaic module is connected is controlled to be input into a rectifier circuit, and an output end of the rectifier circuit is controlled to inject the current into the to-be-rectified photovoltaic module, a rectification circuit needs to be disposed between the alternating-current side of the inverter circuit and the photovoltaic module string that includes the to-be-rectified photovoltaic module, to connect the alternating-current side of the inverter circuit to the photovoltaic module string. The rectifier circuit and a switch are disposed in the rectification circuit, the rectifier circuit is configured to rectify the alternating current, and the switch is configured to control on/off of the rectification circuit.

In the foregoing two implementations of providing a rectification current by the alternating-current side of the inverter circuit, the foregoing switch may also be implemented by using a selection switch.

The current on the alternating-current side is rectified and then injected into the to-be-rectified photovoltaic module. In this way, the current injected into the to-be-rectified photovoltaic module can achieve a relatively good rectification effect. The rectifying the current on the alternating-current side includes: controlling the current on the alternating-current side to flow through the rectifier circuit and then to be injected into the to-be-rectified photovoltaic module. The rectifier circuit usually includes a main circuit, a filter, and a transformer. The main circuit may include a silicon rectifier diode and a thyristor. The filter is connected between the main circuit and the photovoltaic module string, and is configured to filter out an alternating-current component in pulsating direct-current voltage. Whether the transformer is disposed or not is determined depending on a specific case. A role of the transformer is to implement matching between alternating-current input voltage and direct-current output voltage and electrical isolation between an alternating-current power grid and the rectifier circuit.

When a value of the rectification current changes dynamically, if the direct-current side of the inverter circuit is used to provide the rectification current, the inverter circuit controls a value of the output current on the direct-current side based on the foregoing formula. If the alternating-current side of the inverter circuit is used to provide the rectification current, the inverter circuit needs to adjust a value of output voltage on the alternating-current side, so that a rectified output current satisfies a formula requirement.

The injecting the direct current or alternating current into the to-be-rectified photovoltaic module by using an external power supply is implemented as follows: connecting the external power supply to a corrective maintenance port reserved in the inverter circuit, to inject the current of the external power supply, without removing a terminal of the photovoltaic module. In addition to the input end connected to the photovoltaic module string and the output end connected to a power grid, the corrective maintenance port is further disposed in the inverter circuit, to inject the rectification current through the port. In this way, rectification current injection is implemented conveniently. When the rectification current is injected through the corrective maintenance port, a switch in the inverter circuit is controlled to inject the rectification current only into the photovoltaic module string that includes the to-be-rectified photovoltaic module instead of another photovoltaic module string.

The injecting a current into the to-be-rectified photovoltaic module by using a power device is implemented as follows: connecting the power device to a positive or negative electrode of the to-be-rectified photovoltaic module, and applying power to the to-be-rectified photovoltaic module by using the power device, so that a direct current or an alternating current is generated inside the to-be-rectified photovoltaic module to inject a current of the power device; or connecting the power device to the corrective maintenance port reserved in the inverter circuit, to inject a current of the power device.

In another embodiment, step 201 and step 202 may alternatively be replaced with the following manner: during current injection into a to-be-rectified photovoltaic module, directly injecting a rectification current by using an external power supply, until rectification is completed (a rectification time period may be controlled by a maintenance personnel depending on an actual case), without determining a value of the rectification current and a length of the rectification time period.

In this embodiment of this disclosure, there may be one, two, or more photovoltaic module strings that include a to-be-rectified photovoltaic module. Therefore, circuits connected to all photovoltaic module strings in the photovoltaic power station are of a same structural design, so that a photovoltaic module in any photovoltaic module string can be rectified, and photovoltaic modules in two or more photovoltaic module strings can be rectified simultaneously.

In this embodiment of this disclosure, the photovoltaic module is rectified by using the method, so that initial light-induced degradation of the module, material aging degradation of the module, and potential induced degradation can be rectified simultaneously. In addition, the method supports online operations without performing plug-in or plug-out. Degradation of the photovoltaic module can be directly rectified without removing a terminal in a connection box of the photovoltaic module, avoiding a terminal damage and a secondary fault. Rectification can be repeated for multiple times. This avoids a performance decrease caused by subsequent degradation during a long operating time, thereby postponing performance decrease of the photovoltaic module.

After the photovoltaic module is rectified, the following manners may be used to determine a degradation rectification effect: removing the rectified photovoltaic module to perform power and electric energy yield tests, for example, obtaining an after-rectification power through measurement, and obtaining a power rectification ratio based on (after-rectification power−before-rectification power)/nameplate power. In the foregoing manners, it can be determined that, when the method is used for photovoltaic module rectification, initial light-induced degradation of the module can be rectified by over 1%, material aging degradation of the module can be rectified by over 1%, and potential induced degradation can be rectified by over 3%, so that an average electric energy yield of a power station connected to a grid for over one year increases by 1.5%, and degradation of a newly built power station decreases by over 1% in the first year. Using a 100 MW power station in a type-IIi region as an example, an electric energy yield of 1.2 million kWh may be added each year, and an electric energy yield of 30 million kWh is added in 25 years.

The following describes the method provided in this embodiment of this disclosure with reference to specific examples.

Example 1

A power station A uses a 265 W p-type monocrystalline photovoltaic module, and after the power station A is connected to a grid for two years, degradation is rectified by using the method provided in this embodiment of this disclosure. Details are as follows: In the sunlight, an inverter is used to: control a current of a photovoltaic module whose direct-current side generates power normally to be injected into a to-be-rectified photovoltaic module, maintaining a current value at $(30-I_2/0.9)$ A for duration of 3 h. Finally, degradation is rectified by 1.8%.

Example 2

A power station B uses a 270 W p-type monocrystalline photovoltaic module, and after the power station B is connected to a grid, degradation is rectified by using the method provided in this embodiment of this disclosure. Details are as follows: An external alternating-current impulse power supply is used to inject an alternating current to a to-be-rectified photovoltaic module. Parameters of the alternating current are as follows: an impulse amplitude is 1000 V, an impulse width is 0.5 s, an impulse period is 1 s, and duration is 4 h. Finally, degradation is rectified by 1.2%.

Example 3

A power station C uses a 250 W p-type polycrystalline photovoltaic module, and after the power station C is connected to a grid for two years, degradation is rectified by using the method provided in this embodiment of this disclosure. Details are as follows: An inverter is used to: control a current of a photovoltaic module whose alternating-current side generates power normally to be rectified and then injected into a to-be-rectified photovoltaic module, controlling a current value at 15 A for duration of 2.5 h. Finally, degradation is rectified by 1.5%.

Example 4

A power station D uses a 270 W p-type polycrystalline photovoltaic module, and when the power station D is newly built and to be connected to a grid, degradation is rectified by using the method provided in this embodiment of this disclosure. Details are as follows: An inverter is used to: control a current of a photovoltaic module whose direct-current side generates power normally to be injected into a to-be-rectified photovoltaic module, controlling a current value at 22 A for duration of 4 h. Finally, degradation is only 0.3% (less than a first-year common degradation value 3%) in the first year.

Example 5

A power station E uses a 250 W p-type polycrystalline photovoltaic module, and after the power station E is connected to a grid for two years, degradation is rectified by using the method provided in this embodiment of this disclosure. Details are as follows: An inverter is used to: control a current of a photovoltaic module whose alternating-current side generates power normally to be rectified and then injected into a to-be-rectified photovoltaic module, maintaining a current value at $(25-I_2/0.8)$ A for duration of 3 h. Finally, degradation is rectified by 1.8%.

Example 6

A power station F uses a 260 W p-type monocrystalline photovoltaic module, and after the power station F is connected to a grid for two years, degradation is rectified by using the method provided in this embodiment of this disclosure. Details are as follows: An external direct-current power supply is used to: control a direct current to be injected into a to-be-rectified photovoltaic module, controlling a current value at 20 A for duration of 3 h. Finally, degradation is rectified by 2%.

Further, using the method for rectifying degradation of a photovoltaic module in the foregoing photovoltaic power station in this disclosure not only can rectify degradation of the photovoltaic module but also can implement functions such as electroluminescent defect detection, automatic snow melting, and antitheft.

For example, a defect of a photovoltaic module is rectified at night by using a rated current, and an unmanned aerial vehicle is used in rectification to shoot light photos of the photovoltaic module, and the photos are analyzed automatically, to complete electroluminescent defect detection on the photovoltaic module.

During defect rectification on the photovoltaic module, the photovoltaic module generates heat and therefore snow on the photovoltaic module melts.

At night, alternating currents are injected into the photovoltaic module regularly, and a current and voltage of the photovoltaic module are detected. If the photovoltaic module is stolen, a current curve and a voltage curve change, implementing an antitheft function.

It should be noted that the rectification current may be injected into the photovoltaic module string that includes the to-be-rectified photovoltaic module in the sunlight (for example, in the daytime) or without sunlight (for example, on a cloudy day or at night). In the foregoing manners of injecting the rectification current, a solution that another photovoltaic module string in the photovoltaic power station is used as a power supply of a rectification current is applicable in the daytime, and a solution that an external power supply is used as a power supply of a rectification current is applicable in the daytime and at night.

Figure 6:
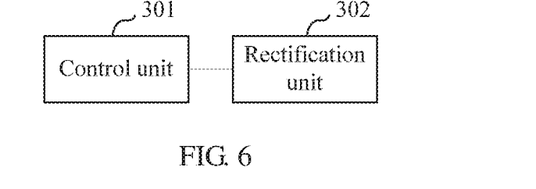
FIG. 6 is a schematic structural diagram of an apparatus for rectifying degradation of a photovoltaic module in a photovoltaic power station according to an embodiment of this disclosure.

An embodiment of this disclosure further provides an apparatus for rectifying degradation of a photovoltaic module in a photovoltaic power station. The apparatus is configured to implement the method for rectifying degradation of a photovoltaic module in a photovoltaic power station. FIG. 6 is a schematic structural diagram of an apparatus for rectifying degradation of a photovoltaic module in a photovoltaic power station according to an embodiment of this disclosure. Referring to FIG. 6, the apparatus includes a control unit 301 and a rectification unit 302.

The control unit 301 is configured to control a to-be-rectified photovoltaic module in a photovoltaic power station to stop outputting, where the to-be-rectified photovoltaic module includes one photovoltaic module or at least two serially-connected photovoltaic modules. The rectification unit 302 is configured to inject a rectification current into a positive or negative electrode of the to-be-rectified photovoltaic module.

Optionally, the rectification current is provided by using a direct current, an alternating current, or a current that alternates between a direct current and an alternating current.

Optionally, the control unit 301 is configured to: determine a value of the rectification current for the to-be-rectified photovoltaic module and a length of a rectification time period of the to-be-rectified photovoltaic module; and control the rectification unit 302 to inject the current into the to-be-rectified photovoltaic module based on the determined value of the rectification current and the determined length of the rectification time period.

Optionally, the value of the rectification current is a specified value or changes dynamically.

Optionally, the control unit 301 is configured to: when the rectification current is provided by a direct current, a value of the rectification current is determined based on the following formula: $I_1 = a + bI_2 + cI_2^2 + dI_2^3$, where $I_1$ is the value of the rectification current, $I_2$ is a sum of currents of other photovoltaic module strings that are connected to a same inverter circuit as a photovoltaic module string that includes the to-be-rectified photovoltaic module in the photovoltaic power station, a, b, c, and d are specified coefficients, $50 \geq a \geq 5$, $10 \geq b \geq -10$, $0.5 \geq c \geq -0.5$, and $0.1 \geq d \geq -0.1$.

Optionally, when the rectification current is provided by a direct current and the value of the rectification current is the specified value, a value range of the rectification current is 1-100 A.

Optionally, when the rectification current is provided by an alternating current, a voltage amplitude range of the alternating current is 20-3000 V, a range of a valid current value of the alternating current is 1-100 A, and a period range of the alternating current is $2 \times 10^{-10}$-$2 \times 10^3$ s.

Optionally, a range of the rectification time period is 0.1-100 h.

Optionally, the rectification unit 302 is another photovoltaic module string connected to an inverter circuit to which the photovoltaic module string that includes the to-be-rectified photovoltaic module is connected; or the rectification unit 302 is a converging module in an inverter circuit to which the photovoltaic module string that includes the to-be-rectified photovoltaic module is connected; or the rectification unit 302 is a direct-current side of an inverter circuit to which the photovoltaic module string that includes the to-be-rectified photovoltaic module is connected; or the rectification unit 302 is a rectifier circuit to which an alternating-current side of an inverter circuit to which the photovoltaic module string that includes the to-be-rectified photovoltaic module is connected; or the rectification unit 302 is an alternating-current side of an inverter circuit to which the photovoltaic module string that includes the to-be-rectified photovoltaic module is connected; or the rectification unit 302 is an external power supply that outputs a direct current; or the rectification unit 302 is an external power supply that outputs an alternating current.

When the rectification unit 302 is another photovoltaic module string connected to an inverter circuit to which the photovoltaic module string that includes the to-be-rectified photovoltaic module is connected, the control unit 301 may include a rectification switch. The rectification switch may be disposed between the inverter circuit and the photovoltaic module string. The rectification switch is controlled to make a current of the another photovoltaic module string flow to the photovoltaic module string that includes the to-be-rectified photovoltaic module. For example, the rectification switch may include two selection switches. The two selection switches are respectively disposed between one output end of the another photovoltaic module string and an input end of the inverter circuit and between the other output end of the another photovoltaic module string and the input end of the inverter circuit. When a selection switch is connected to a first contact, the another photovoltaic module string is connected to the input end of the inverter circuit, to output a current of the photovoltaic module string. When a selection switch is connected to a second contact, the another photovoltaic module string is connected to a photovoltaic module string that includes the to-be-rectified photovoltaic module, so that a current of the another photovoltaic module string flows to the to-be-rectified photovoltaic module.

When the rectification unit 302 is a converging module in an inverter circuit to which the photovoltaic module string that includes the to-be-rectified photovoltaic module is connected, the control unit 301 may include a rectification switch. The rectification switch may be disposed between an input end of the converging module and the photovoltaic module string. The rectification switch is controlled to make an output current of the converging module flow to the photovoltaic module string that includes the to-be-rectified photovoltaic module. For example, the rectification switch may include two selection switches. The two selection switches are respectively disposed between one output end of the photovoltaic module string that includes the to-be-rectified photovoltaic module and an input end of the converging module and between the other output end of the photovoltaic module string that includes the to-be-rectified photovoltaic module and the input end of the converging module. When a selection switch is connected to a first contact, the photovoltaic module string that includes the to-be-rectified photovoltaic module is connected to the input end of the converging module, to output the current of the photovoltaic module string. When a selection switch is connected to a second contact, the photovoltaic module string that includes the to-be-rectified photovoltaic module is connected to an output end of the converging module, so that an output current of the converging module flows to the to-be-rectified photovoltaic module. It should be noted that the inverter circuit in this embodiment of this disclosure may be a centralized inverter or a string inverter, and the converging module exists only in the centralized inverter. Therefore, the converging module can be used to inject a current only when the inverter circuit is a centralized inverter.

When the rectification unit 302 is a direct-current side of an inverter circuit to which the photovoltaic module string that includes the to-be-rectified photovoltaic module is connected, the control unit 301 may include a short-circuit switch in an inverter circuit or a diode in an inverter circuit. The short-circuit switch is turned on or the diode is short-circuited, so that a current on the direct-current side of the inverter circuit flows to the photovoltaic module string that includes the to-be-rectified photovoltaic module. The short-circuit switch or the diode is an original structure of the inverter circuit. An original role of the diode is to prevent current backflow. However, in this embodiment, a switch needs to be connected to the diode in parallel to inject the current, and the diode becomes short-circuited by controlling the switch to be turned on.

When the rectification unit 302 is a rectifier circuit connected to an alternating-current side of an inverter circuit to which the photovoltaic module string that includes the to-be-rectified photovoltaic module is connected, or when the rectification unit 302 is an alternating-current side of an inverter circuit to which the photovoltaic module string that includes the to-be-rectified photovoltaic module is connected, the control unit 301 may include a rectification circuit disposed between the alternating-current side of the inverter circuit and the photovoltaic module string, where a switch is disposed in the rectification circuit; or the control unit 301 may include a rectification circuit disposed between the alternating-current side of the inverter circuit and the photovoltaic module string, where a switch is disposed in the rectification circuit, and the foregoing rectifier circuit is also disposed in the rectification circuit.

The current on the alternating-current side is rectified and then injected into the to-be-rectified photovoltaic module. In this way, the current injected into the to-be-rectified photovoltaic module can achieve a relatively good rectification effect. The rectifier circuit may include a main circuit, a filter, and a transformer. The main circuit may include a silicon rectifier diode and a thyristor. The filter is connected between the main circuit and the photovoltaic module string, and is configured to filter out an alternating-current component in pulsating direct-current voltage. Whether the transformer is disposed or not is determined depending on a specific case. A role of the transformer is to implement matching between alternating-current input voltage and direct-current output voltage and electrical isolation between an alternating-current power grid and the rectifier circuit.

When a value of the rectification current changes dynamically, if the direct-current side of the inverter circuit is used to provide the rectification current, the control unit 301 controls a value of the output current on the direct-current side based on the foregoing formula. If the alternating-current side of the inverter circuit is used to provide the rectification current, the control unit 301 needs to adjust a value of output voltage on the alternating-current side, so that a rectified output current satisfies a formula requirement.

When the rectification unit 302 is an external power supply that outputs a direct current, or when the rectification unit 302 is an external power supply that outputs an alternating current, the rectification unit 302 further includes a corrective maintenance port reserved in the inverter circuit. The external power supply is connected to the corrective maintenance port reserved in the inverter circuit, to inject the current of the external power supply without removing a terminal of the photovoltaic module. In addition to the input end connected to the photovoltaic module string and the output end connected to a power grid, the corrective maintenance port is further disposed in the inverter circuit, to inject the rectification current through the port. In this way, rectification current injection is implemented conveniently.

In this implementation, when the current of the rectification unit 302 is injected, there is no need to perform controlling by using the control unit.

Optionally, the control unit 301 is further configured to: determine current environment information, where the current environment information includes at least one of an ambient temperature, a wind speed, and a solar light intensity; and adjust the determined value of the rectification current and the determined length of the rectification time period based on the current environment information.

Optionally, the control unit 301 is configured to: when the ambient temperature is greater than a specified temperature value or the wind speed is less than a specified wind speed value or the solar light intensity is greater than a specified light intensity value, decrease the current value of the rectification current or decrease the length of the rectification time period; or when the ambient temperature is less than a specified temperature value or the wind speed is greater than a specified wind speed value or the solar light intensity is less than a specified light intensity value, increase the current value of the rectification current or increase the length of the rectification time period.

For related details, refer to the method embodiment in FIG. 3 or FIG. 4.

It should be noted that the control unit 301 may further include a collection circuit and a processor. The collection circuit is configured to collect environment information, a current value, and the like. The processor executes program instructions in a memory to determine a value of the rectification current and a length of a rectification time period.

The foregoing descriptions are merely optional embodiments of this disclosure, but are not intended to limit this disclosure. Any modification, equivalent replacement, or improvement made without departing from the spirit and principle of this disclosure shall fall within the protection scope of this disclosure.

What is claimed is:

1. A method for rectifying degradation of a photovoltaic module in a photovoltaic power station, the method comprising:
controlling a to-be-rectified photovoltaic module in the photovoltaic power station to stop outputting, wherein the to-be-rectified photovoltaic module comprises one photovoltaic module or at least two serially-connected photovoltaic modules; and
injecting a rectification current into a positive or negative electrode of the to-be-rectified photovoltaic module.

2. The method according to claim 1, wherein the rectification current is provided by using a direct current, an alternating current, or a current that alternates between a direct current and an alternating current.

3. The method according to claim 2, wherein the injecting of the rectification current into the positive or negative electrode of the to-be-rectified photovoltaic module comprises:
determining a value of the rectification current for the to-be-rectified photovoltaic module and a length of a rectification time period of the to-be-rectified photovoltaic module; and
injecting the rectification current into the to-be-rectified photovoltaic module based on the determined value of the rectification current and the determined length of the rectification time period.

4. The method according to claim 3, wherein the value of the rectification current is a specified value or changes dynamically.

5. The method according to claim 4, wherein when the rectification current is provided by the direct current, the value of the rectification current is determined by using the following formula: $I_1=a+bI_2+cI_2^2+dI_2^3$, wherein $I_1$ is the value of the rectification current, $I_2$ is a sum of currents of other photovoltaic module strings that are connected to a same inverter circuit as a photovoltaic module string that includes the to-be-rectified photovoltaic module in the photovoltaic power station, a, b, c, and d are specified coefficients, and 50≥a≥5, 10≥b≥−10, 0.5≥c≥−0.5, and 0.1≥d≥−0.1.

6. The method according to claim 4, wherein when the rectification current is provided by the direct current and the value of the rectification current is the specified value, and a value range of the rectification current is 1-100 A.

7. The method according to claim 4, wherein when the rectification current is provided by the alternating current, a voltage range of the alternating current is 20-3000 V, a range of a valid current value of the alternating current is 1-100 A, and a period range of the alternating current is $2\times10^{-10}$-$2\times10^3$ s.

8. The method according to claim 3, wherein a range of the rectification time period is 0.1-100 h.

9. The method according to claim 3, wherein the injecting of the rectification current into the to-be-rectified photovoltaic module based on the determined value of the rectification current and the determined length of the rectification time period comprises:

controlling another photovoltaic module string connected to an inverter circuit to which a photovoltaic module string comprising the to-be-rectified photovoltaic module is connected, to inject the rectification current into the to-be-rectified photovoltaic module; or controlling a current of a converging module in an inverter circuit to which the photovoltaic module string comprising the to-be-rectified photovoltaic module is connected, to be injected into the to-be-rectified photovoltaic module; or controlling a direct-current side of an inverter circuit to which the photovoltaic module string comprising the to-be-rectified photovoltaic module is connected, to inject the rectification current into the to-be-rectified photovoltaic module; or controlling a current on an alternating-current side of an inverter circuit to which the photovoltaic module string comprising the to-be-rectified photovoltaic module is connected, to be input into a rectifier circuit, and controlling an output end of the rectifier circuit to inject the rectification current into the to-be-rectified photovoltaic module; or controlling an alternating-current side of an inverter circuit to which the photovoltaic module string comprising the to-be-rectified photovoltaic module is connected, to inject the rectification current into the to-be-rectified photovoltaic module; or injecting the rectification current into the to-be-rectified photovoltaic module by using an external power supply; or injecting the rectification current into the to-be-rectified photovoltaic module by using a power device.

10. The method according to claim 9, wherein the controlling of the current on the alternating-current side of the inverter circuit to which the photovoltaic module string comprising the to-be-rectified photovoltaic module is connected, to be input into the rectifier circuit, and controlling an output end of the rectifier circuit to inject the rectification current into the to-be-rectified photovoltaic module comprises:

controlling the rectification current on the alternating-current side of the inverter circuit to which the photovoltaic module string comprising the to-be-rectified photovoltaic module is connected, to be input into the rectifier circuit, adjusting the rectification current input into the rectifier circuit, by adjusting voltage or power of the rectifier circuit, and controlling the output end of the rectifier circuit to inject the adjusted current into the to-be-rectified photovoltaic module.

11. The method according to claim 9, wherein the injecting of the rectification current into the to-be-rectified photovoltaic module by using the external power supply comprises:

applying voltage to the positive or negative electrode of the to-be-rectified photovoltaic module by using the external power supply, so that the direct current or the alternating current is generated inside the to-be-rectified photovoltaic module.

12. The method according to claim 9, wherein the injecting of the rectification current into the to-be-rectified photovoltaic module by using the power device comprises:

applying power to the positive or negative electrode of the to-be-rectified photovoltaic module by using the power device, so that the direct current or the alternating current is generated inside the to-be-rectified photovoltaic module.

13. The method according to claim 3, wherein the method further comprises: determining current environment information, wherein the current environment information comprises at least one of an ambient temperature, a wind speed, and/or a solar light intensity; and adjusting the determined value of the rectification current and the determined length of the rectification time period based on the current environment information.

14. The method according to claim 13, wherein the adjusting of the determined value of the rectification current and the determined length of the rectification time period based on the current environment information comprises:

when the ambient temperature is greater than a specified temperature value or the wind speed is less than a specified wind speed value or the solar light intensity is greater than a specified light intensity value, decreasing the current value of the rectification current or decreasing the length of the rectification time period; or when the ambient temperature is less than a specified temperature value or the wind speed is greater than a specified wind speed value or the solar light intensity is less than a specified light intensity value, increasing the current value of the rectification current or increasing the length of the rectification time period.

15. An apparatus for rectifying degradation of a photovoltaic module in a photovoltaic power station, the apparatus comprising:

a non-transitory memory having processor-executable instructions stored thereon; and a processor, coupled to the memory, configured to execute the processor-executable instructions to:

control a to-be-rectified photovoltaic module in the photovoltaic power station to stop outputting, wherein the to-be-rectified photovoltaic module comprises one photovoltaic module or at least two serially-connected photovoltaic modules; and inject a rectification current into a positive or negative electrode of the to-be-rectified photovoltaic module.

16. The apparatus according to claim 15, wherein the rectification current is provided by using a direct current, an alternating current, or a current that alternates between a direct current and an alternating current.

17. The apparatus according to claim 16, wherein the processor is further configured to:
- determine a value of the rectification current for the to-be-rectified photovoltaic module and a length of a rectification time period of the to-be-rectified photovoltaic module; and
- control the apparatus to inject the rectification current into the to-be-rectified photovoltaic module based on the determined value of the rectification current and the determined length of the rectification time period.

18. The apparatus according to claim 17, wherein the value of the rectification current is a specified value or changes dynamically.

19. The apparatus according to claim 17, wherein a range of the rectification time period is 0.1-100 h.

20. The apparatus according to claim 17, wherein the processor is further configured to: determine current environment information, wherein the current environment information comprises at least one of an ambient temperature, a wind speed, and/or a solar light intensity; and adjust the determined value of the rectification current and the determined length of the rectification time period based on the current environment information.

* * * * *

UNITED STATES PATENT AND TRADEMARK OFFICE
CERTIFICATE OF CORRECTION

PATENT NO. : 11,329,600 B2
APPLICATION NO. : 16/906280
DATED : May 10, 2022
INVENTOR(S) : Gu et al.

It is certified that error appears in the above-identified patent and that said Letters Patent is hereby corrected as shown below:

In the Specification

Column 3, Line 57, please change:
"…and $0.1 \geq d \geq -4.1$."
To:
"…and $0.1 \geq d \geq$ -0.1."

Column 8, Line 21, please change:
"…degradation masons."
To:
"…degradation reasons."

Signed and Sealed this
Fourteenth Day of June, 2022

Katherine Kelly Vidal
*Director of the United States Patent and Trademark Office*